Figure 1:
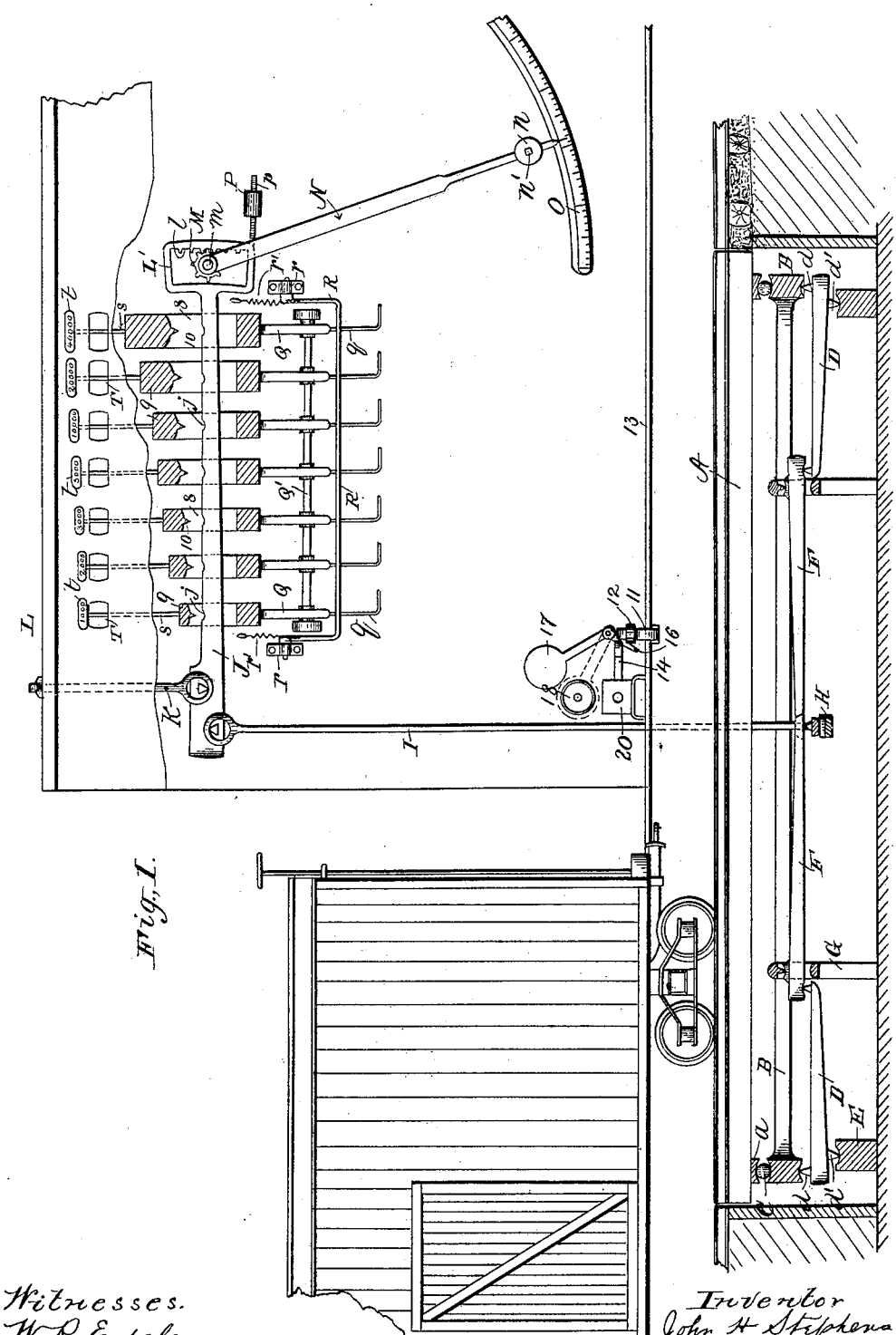

No. 628,558. Patented July 11, 1899.
J. H. STEPHENS.
COMBINED MULTIPLE WEIGHT AND PENDULUM SCALE.
(Application filed May 7, 1897.)

(No Model.) 2 Sheets—Sheet 1.

Witnesses.
W. R. Edelen
M. A. Edelen

Inventor
John H. Stephens
by Albert D. Shrewsbury
Atty

No. 628,558. Patented July 11, 1899.
J. H. STEPHENS.
COMBINED MULTIPLE WEIGHT AND PENDULUM SCALE.
(Application filed May 7, 1897.)
(No Model.) 2 Sheets—Sheet 2.
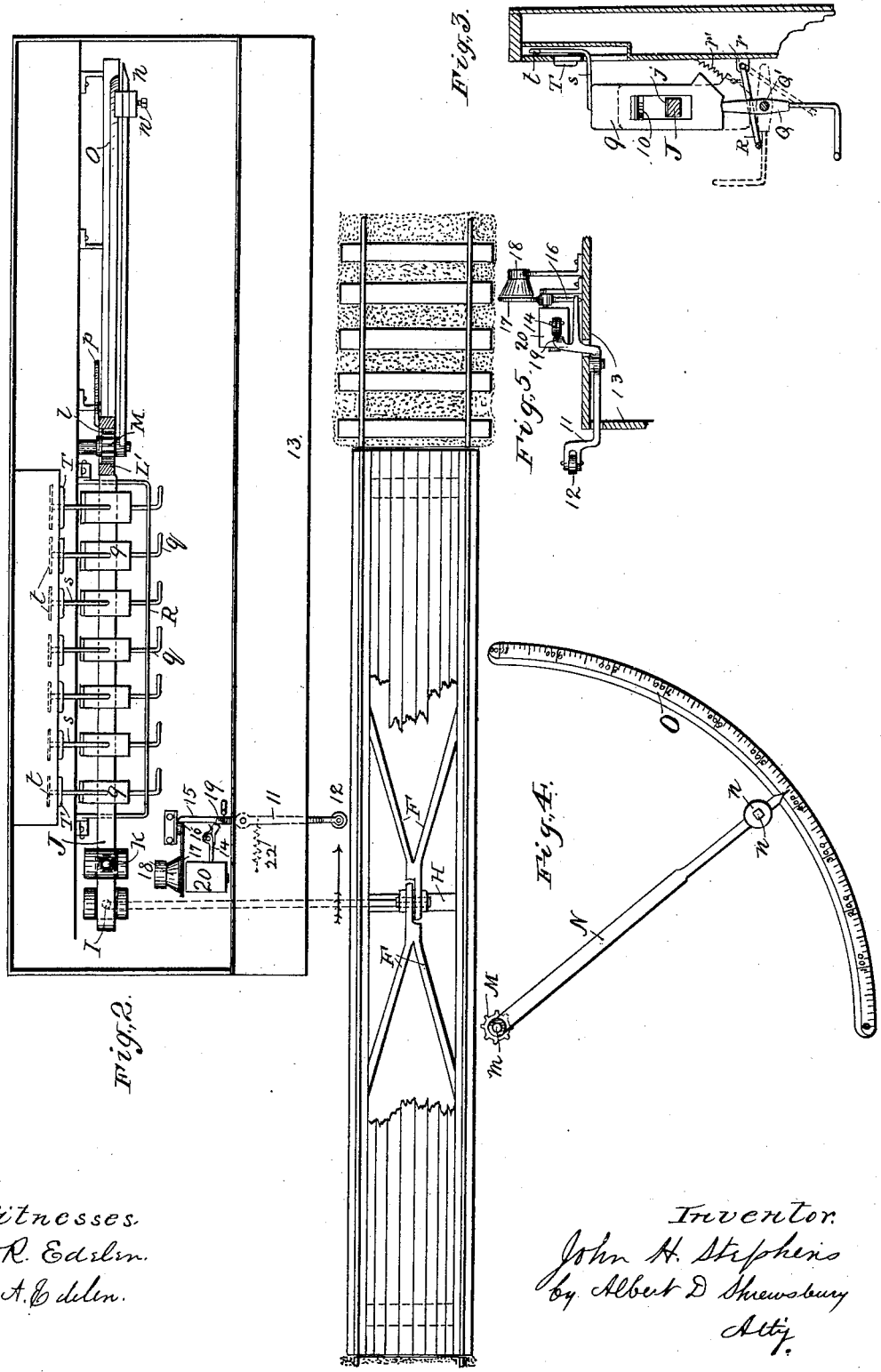
Witnesses.
W. R. Edelen.
M. A. Edelen.
Inventor.
John H. Stephens
by Albert D. Shrewsbury
Atty.

UNITED STATES PATENT OFFICE.

JOHN H. STEPHENS, OF VERNON, TEXAS.

COMBINED MULTIPLE WEIGHT AND PENDULUM SCALE.

SPECIFICATION forming part of Letters Patent No. 628,558, dated July 11, 1899.

Application filed May 7, 1897. Serial No. 635,565. (No model.)

*To all whom it may concern:*

Be it known that I, JOHN H. STEPHENS, a citizen of the United States, residing at Vernon, in the county of Wilbarger and State of Texas, have invented certain new and useful Improvements in a Combined Multiple Weight and Pendulum Scale and Appliance; and I do hereby declare the following to be a full, clear, and exact description of the invention, such as will enable others skilled in the art to which it appertains to make and use the same.

My invention has reference to improvements in platform-scales and appliances; and it consists of certain novel features of construction, which will be hereinafter fully described in the specification with reference to the drawings, and pointed out in the claims.

The object of the present invention is to devise a suitable scale which will meet all the wants for ordinary purposes and at the same time fill all the requirements of a specific character which the invention calls for. The platform-scales in general use will meet all the requirements where time in weighing and accuracy of the same are not considered too finely, especially in railroad-scales, where cars are weighed when running slowly over the same. Even at a moderate speed it is practically impossible to manipulate the heavy weights on the counterpoise and then exactly register the smaller weights upon the beam, as the time is too limited for accurate weighing, which is very detrimental financially to a railroad company where the tonnage is heavy of opposing roads. What is wanted is a scale that will automatically register the fractions of one thousand pounds, more or less, and also afford means whereby each weight can be readily manipulated in an independent position through appropriate mechanical devices and also the amounts of weighing by the several weights be indicated beyond a doubt as to their correct results. Such a weighing device has been invented offering increased facilities for accurately ascertaining the tonnage of cars when shipped over a railroad-scale at a speed of ten or fifteen miles per hour. In coal-mines, where cars are generally run on a downgrade, it requires a quick and experienced weigher to accurately estimate the output of a mine. By my simple and improved device of employing a number of graded weights on a beam through appropriate mechanism for manipulating said weights I arrive at positive and accurate results in combination with a supplemental pendulum-scale for ascertaining the fraction of one thousand pounds.

Weighing of cars is invariably a continuous operation, and for meeting such requirements, especially at night, I employ certain appliances, which consist mainly of an electric or a flash light and a kodak-camera, the flash-light being provided with a cover, which is operated by a lever coming in contact with the end and side of a passing car. Said lever also manipulates the kodak instantly by an appropriate latch-movement. When employing the kodak during the day, which is for photographing the weight and number of a car, the same lever is employed for snapping the kodak that operates the flash-light. By this means the successful handling of cars by a single person stationed in the weighing office obviates the necessity of employing extra help for registering the car-numbers.

Referring to the drawings, in which corresponding letters and numerals of reference indicate like parts in all the views, Figure 1 represents an inside elevation, also partly in section, of my improved weighing device. Fig. 2 represents a plan of my improved device, partly broken away. Fig. 3 indicates a portion of the device in end elevation, with a weight and its operating mechanism in extreme positions, full and also in dotted lines. Fig. 4 is a side elevation in detail of the pendulum device. Fig. 5 is a side elevation of the kodak, flash-light, and mechanism for operating the same.

In the general description, A indicates a platform-scale, which has suitable bearings $a$ and a rectangular frame B. Between said scale and frame are interposed steel balls C, so as to prevent undue vibration coming upon the knife-edges of the scale. Said frame B is supported by levers D through the medium of knife-edge bearings $d$ and $d'$, the fulcrum-bearing $d'$ being mounted on foundation-blocks E. The long arm of said levers D bears against the short arm of levers F, which are held in position by saddle tension-straps G. The long arm of said levers F, which converge to a common center, (see Fig. 2,) is supported by a fulcrumed lever H at right angles to lever F of the second class. The long arm of said lever connects direct to the tension-rod I, which is secured to the scale-beam J, said scale-beam J being mounted on knife-edge bearings in the ordinary manner and supported by a tension-rod K and frame-beam L. The extreme free end of said beam J is provided with a yoke L', said yoke having an internal gear $l$ for engagement with a pinion M, mounted on a shaft $m$. Also mounted on shaft $m$ is an index-hand or pointer N for indicating the weights registered on a quadrant O in combination with the scale-beam J previously referred to. On said pointer N is an adjustable weight $n$, with a set-screw $n'$ for securing and balancing said pointer N in conjunction with adjusting-weight P, mounted on the screw-threaded rod $p$, which is secured to said scale-beam J. Scale-beam J is provided with a number of notches $j$, which can be of any predetermined distance apart, (when building a scale,) to accommodate weights 9 9 9, &c. Said weights have mortises 8 cut laterally through them, so as to envelop said beam J. The upper portion of each mortise has a knife-edge 10 for engagement with the notches $j$ previously referred to. Said weights 9 are held in their elevated position by means of levers Q, which are mounted on a shaft Q'. Said levers Q have suitable handles $q$ for operating each weight 9 independently. Passing immediately in front and above said handles $q$ is a rod-lever R, fulcrumed in bearings $r$ $r$ and provided with springs $r'$ $r'$. Said springs are for returning said rod-lever to its normal position when manipulated by the weigher.

Secured to the top of each weight 9 are rods $s$ $s$, &c., for supporting figure-plates $t$ $t$, said plates being adapted to appear immediately before the opening T when a weight 9 is allowed to rest upon the scale-beam J. By this means an operator can manipulate the weight-levers without observing the scale-beam, as the figures indicating the weight of each weight will appear in said openings or windows T. All that is necessary is for the weigher to observe the index-hand or pointer N, as it will be the proper guide in reference to adding or taking the weights 9 from scale-beam J.

Mounted on a stand in the weigher's office is a kodak instrument 20 for photographing the respective weights and also numbers which are painted on the cars. The kodak has a spring-snap device similar to those in present use. This device is operated by means of a lever 11, which has attached to its exposed end a rubber-covered roller 12. Said lever is fulcrumed under the car-platform 13 and, passing through the floor in the office, connects with the spring-snap rod 14, attached to the kodak. The end of this lever 11 has a prolongation 15 (see Figs. 1, 2, and 3) for engaging the end of a bell-crank lever 16, which operates a screen or cover 17, secured to said lever, when necessary to expose the flash-light 18. The flash-light and kodak are operated by means of a wheel or roller 12 striking the front end of a passing car, then remaining against the side of said car. As soon as the roller bears against the side of a car the end of lever 19, bearing against the snap-rod 14 of the kodak, forces said rod in sufficiently to open the kodak, when the end of said lever 19 slips past hinged end of rod 14, thus instantly operating the kodak, while the lever-wheel remains upon the side of the car until said car has passed beyond said lever, when said lever 11 regains its normal position by slipping past to the right of said snap-rod 14 through the medium of spring 22. The same lever operates the flash-light that manipulates the kodak, but with this difference, the kodak is snapped immediately, while the bell-crank lever 16 of the flash-light is held open as long as the roller 12 remains against the car, the reason for which is obvious, as the operator or weigher is perhaps desirous of observing other marks upon the car than the weigh-number, thus requiring a light for such purpose, and my improved and convenient devices connected with my scale are so arranged that the operator has no need of paying so much attention to the weighing as would be necessary with the ordinary scales used for this purpose.

When operating my improved scales, the operator lowers the heavier weights 9 by means of levers Q upon the beam J. Then observing the pointer N as a car enters the scales he can readily ascertain if more weights are required on the scale-beam J, which can be quickly and accurately lowered upon said beam, as there is no shifting of weights upon beam J; but each weight has its appropriate number and rests in a fixed place or point upon said beam. When the pointer N remains between the zero-point and the extreme one-thousand-pound marks on the quadrant O, the weighing is completed for that car, the operator taking off the fractions of one thousand pounds from the quadrant O immediately before the car leaves the scale; but the weight-numbers appearing upon the figure-plates $t$ remain opposite their individual window T until the operator shifts the weights 9, which is accomplished by a downward push of the rod-lever R, making contact with all the handles $q$, and consequently all weights 9 remaining upon the scale-beam J are elevated to their normal position.

This weighing device can be attached to any of the ordinary forms of platform-scales.

I do not limit myself to this particular form of mechanism for operating and recording the various weights, as other devices can be employed without departing from the spirit of my invention.

That which I consider as new, and desire to secure by Letters Patent, is—

1. In a combined multiple weight and pendulum scale the combination of a weighing-beam having a segmental toothed arc and provided with a number of notches, graded weights supported above said notches, and a weighted pointer having a pinion engaged by said segment, as specified.

2. In a combined multiple weight and pendulum scale, having a weighing-beam adapted to be operated by graded weights held immediately above said beam, the combination of a toothed arc forming a part of said beam, a weighted pointer for registering the amount weighed, and a toothed pinion engaging said arc, all operating substantially as specified.

3. In a combined multiple weight and pendulum scale having a weighing-beam with suitable notches for engaging graded weights which are held free from said beam by pivoted levers, and the means for operating said graded weights by hand, the combination of a toothed segment on said beam, and a weighted pointer operated by said segment for indicating the total of the amounts weighed substantially as specified.

4. In a combined multiple weight and pendulum scale having a weighing-beam with notches for engaging graded weights, said weights being held above said scale-beam and supported in their elevated position by independent pivoted levers, the combination of a trip-lever for returning said pivoted levers to their normal position with their respective weights resting on each pivoted lever, and the means for observing the amount of each weighing as specified.

5. In a combined multiple weight and pendulum scale having a beam provided with notches, for engaging graded weights, said weights being held above said beam, and supported in their elevated position by pivoted levers the combination of handles $q$, and trip-lever R, as shown.

6. The combination in a combined multiple weight and weighing-scale, of a scale-beam adapted to engage a series of graded weights, and having a yoke carrying a segmental arc, and a pinion engaged thereby having an indicator for indicating the amount weighed through the medium of a pointer substantially as specified.

In testimony whereof I affix my signature in presence of two witnesses.

JOHN H. STEPHENS.

Witnesses:
W. REES EDELEN,
REEVE LEWIS.